United States Patent Office 3,591,547
Patented July 6, 1971

---

3,591,547
URETHANE COATING COMPOSITIONS BASED ON POLYOLS PREPARED FROM FLUORINATED GLYCIDYL ETHERS
Max M. Boudakian, Hamden, Maurice C. Raes, Branford, and Venkataramaraj S. Urs, Cheshire, Conn., assignors to Olin Corporation
No Drawing. Filed Apr. 12, 1968, Ser. No. 721,048
Int. Cl. C08g 22/10, 51/28, 51/34
U.S. Cl. 260—32.8
13 Claims

ABSTRACT OF THE DISCLOSURE

Isocyanate-terminated prepolymers are prepared by reacting a polyether polyol prepared from a fluorinated glycidyl ether, a polyfunctional initiator, and preferably an alkylene oxide, with an organic diisocyanate. Urethane-forming coating compositions can be prepared by admixing these prepolymers with an inert organic solvent. The isocyanate-terminated prepolymers and urethane-forming coating compositions are cured to provide urethane coatings having superior chemical and mechanical properties.

---

The invention herein described was made in the course of or under a contract, with the Department of the Navy.

This invention relates to selected isocyanate-terminated prepolymers and to urethane-forming coating compositions. More particularly this invention relates to isocyanate-terminated prepolymers and urethane-forming coating compositions based on polyether polyols prepared from fluorinated glycidyl ethers.

The preparation of urethane products from halogenated epoxides has been previously disclosed in the literature. Thus, for example, U.S. 3,318,960 discloses polyethers prepared from polyhydric initiators and non-glycidyl halogenated epoxides; these polyethers are then employed in the preparation of various polyurethanes.

The reaction of fluorinated epoxides, e.g., poly(3,3,3-trifluoropropylene oxide), with fluorinated isocyanates such as tetrafluoro-p-phenylene diisocyanate, is reported by J. Hollander et al. in Highly Fluorinated Polyurethanes, Polymer Preprints, ACS Division of Polymer Chemistry, Chicago, vol. 8, No. 2, September 1967.

While such urethane products have utility in selected areas, they are unsatisfactory for certain specialized applications where high-performance urethanes having superior mechanical and chemical properties are required. Thus, for example, sealants for aircraft must possess excellent solvent resistance, flexibility, tensile strength and elongation.

Now it has been found that selected isocyanate-terminated prepolymers prepared by reacting a fluorinated glycidyl ether-based polyether polyol with an organic diisocyanate provide superior urethane coatings.

The polyether polyols employed in the preparation of the isocyanate-terminated prepolymers of this invention are prepared by reacting a polyfunctional initiator with a fluorinated glycidyl ether having the formula

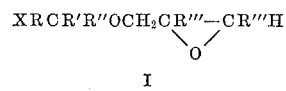

wherein X is fluorine or hydrogen, R is perfluoroalkyl, R' and R" are independently selected hydrogen or perfluoroalkyl and R''' is hydrogen or alkyl. These fluorinated glycidyl ethers I are readily provided by reacting the appropriate alcohol with an alkali metal material and a glycidyl halide as described in Canadian Patent 724,201.

Illustrative fluorinated glycidyl ethers suitable for use in the practice of this invention include those compounds I wherein X is fluorine or hydrogen, R is perfluoroalkyl having 1–10 carbon atoms, R' and R" are independently selected hydrogen or perfluoroalkyl having 1–10 carbon atoms and R''' is hydrogen or lower alkyl, i.e., alkyl having 1 to 5 carbon atoms.

Exemplificative fluorinated glycidyl ethers I include heptafluoroisopropyl glycidyl ether,
1,2-dihydropentafluoroisopropyl glycidyl ether,
1,2,2'-trihydrotetrafluoroisopropyl glycidyl ether,
1,2-dihydro-1-(difluoromethyl)-difluoroethyl glycidyl ether,
1-hydro-hexafluoroisopropyl glycidyl ether,
1,1-dihydrotrifluoroethyl glycidyl ether,
1,1-dihydropentafluoropropyl glycidyl ether,
1,1-dihydrononafluoropentyl glycidyl ether,
1,1,6-trihydrodecafluorohexyl glycidyl ether,
1,1,7-trihydrododecafluoroheptyl glycidyl ether,
1,1-dihydrotridecafluoroheptyl glycidyl ether,
1,1-dihydropentadecafluorooctyl glycidyl ether,
1,1,9-trihydrohexadecafluorononyl glycidyl ether,
2-trifluoroethyl-$\beta$-methyl glycidyl ether,
2-trifluoroethyl-$\beta$-ethyl glycidyl ether,
1,1,9-trihydrohexadecafluorononyl-$\beta$-methyl glycidyl ether,
1,1,9-trihydrohexadecafluorononyl-$\beta$-n-propyl glycidyl ether,
1,1-dihydropentadecafluorooctyl-$\alpha$-methyl glycidyl ether,
1,1-dihydropentadecafluorooctyl-$\alpha$-ethyl glycidyl ether and
1,1,2-trihydro-2-(bis-trifluoromethyl)-ethyl-$\alpha$-methyl glycidyl ether.

While any fluorinated glycidyl ether having the Formula I can be employed in the practice of this invention, preferred embodiments utilize those glycidyl ethers I wherein X is hydrogen or fluorine, R is perfluoroalkyl having 1–10 carbon atoms and R', R" and R''' are hydrogen.

Any polyfunctional initiator having between 3 and 8 reactive hydrogen groups per molecule can be employed in the preparation of the fluorinated glycidyl ether-based polyether polyol. Illustrative polyfunctional initiators include, but are not limited to, glycerine; trimethylolethane; trimethylolpropane; pentaerythritol; dipentaerythritol; tripentaerythritol; inositol; disaccharides such as sucrose; monosaccharides such as glucose, sorbitol and fructose; and aliphatic and aromatic diamines such as ethylene diamine, 2,4-toluene diamine, 2,6-toluene diamine and melamine.

Preferably, an alkylene oxide is also employed in the preparation of the fluorinated glycidyl ether-based polyether polyol. By alkylene oxide is meant the vicinal oxides, that is, those in which the oxygen atoms is attached to 2 adjacent aliphatic carbon atoms. Exemplificative alkylene oxide reactants are ethylene oxide, 1,2 - propylene oxide, 1,2-and 2,3-butylene oxides, isobutylene oxide, butadiene monoxide, styrene oxide and the like. Particularly preferred are the lower alkylene oxides, that is those alkylene oxides having 2 to 4 carbon atoms. The alkylene oxide is employed in any amount up to about 60 percent by weight of the total polyfunctional initiator and fluorinated glycidyl ether I.

The preferred polyether polyols are readily provided by reacting the appropriate materials in the presence of an acid catalyst at a temperature between about 30° and 200° C. Any inorganic, organic or Lewis acid catalyst can be suitably employed. Thus, boron trifluoride etherate, boron trifluoride, aluminum chloride and antimony pentachloride can be utilized.

Both random and block polyether polyols can be prepared and employed in the preferred practice of this invention. Thus, the order of addition of the polyether-forming reactants is not critical. For example, the fluorinated glycidyl ether I can be added to oxyalkylated initiator or the fluorinated glycidyl ether can be added to the initiator and subsequently reacted with alkylene oxide. It is also feasible to add fluorinated glycidyl ether I and alkylene oxide to the polyhydric initiator in step-wise fashion. Mixtures of alkylene oxide can be suitably employed; it is also contemplated to employ different types of alkylene oxides by means of sequential addition.

The fluorinated glycidyl-based polyether polyol preferably has a hydroxyl number between about 20 and 200 mg. KOH/g., and a fluorine content between about 5 and about 55, and preferably between about 20 and 40 percent by weight.

Any organic diisocyanate can be employed which is capable of reacting with the aforesaid fluorinated glycidyl ether-based polyols to provide an isocyanate-terminated prepolymer. Illustrative organic diisocyanates of this type may be represented by the formula:

$$R(NCO)_2$$

where R is a divalent organic moiety selected from the group consisting of divalent aliphatic having between about 1 and about 8 carbon atoms, divalent cycloalkylene having between about 1 and about 8 carbon atoms, divalent aromatic having between 6 and about 12 carbon atoms, and divalent aliphatic-aromatic having between about 7 and about 14 carbon atoms.

Typical examples of suitable organic diisocyanates include aliphatic diisocyanates such as ethylene, trimethylene, tetramethylene, pentamethylene, hexamethylene, propylene-1,2, butylene-1,2, butylene-2,3, butylene-1,3, ethylidene and butylidene diisocyanates; cycloalkylene diisocyanates such as cyclopentylene-1,3, cyclohexylene-1,4, and cyclohexylene-1,2 diisocyanates; aromatic diisocyanates such as m-phenylene, p-phenylene, 4,4'-diphenyl and 1,5-naphthylene diisocyanates; aliphatic-aromatic diisocyanates such as 4,4'-diphenylene methane, 2,4-toluene, 2,6-toluene, 4,4'-toluidine and 1,4-xylene diisocyanates; nuclear substituted aromatic diisocyanates such as dianisidine diisocyanate, 4,4'-diphenyl ether diisocyanate and chloro-diphenylene diisocyanate, mixtures thereof, isomers thereof and the like.

The preparation of the isocyanate-terminated prepolymer employing the aforesaid fluorinated glycidyl ether-based polyol and organic diisocyanate is preferably carried out under exclusion of moisture to preclude premature curing of the composition as described hereinafter. Thus, the reaction is carried out under a nitrogen blanket at a temperature between about 60° and 100° C. Solvents can be employed in the preparation of the isocyanate-terminated prepolymers, although they are not necessary to the practice of this invention. Suitable solvents include ethylene glycol monoethylether acetate, xylene, toluene, methyl ethyl ketone, methyl isobutyl ketone, cyclohexanone and other alkyl-substituted ketones and acetates, either individually or mixed with each other.

The fluorinated glycidyl ether-based polyether polyol and the organic diisocyanate are employed in a proportion sufficient to provide between about 1.2 and about 2.2, and preferably between about 1.4 and about 2.0, —NCO groups in the organic diisocyanate per —OH group in the fluorinated glycidyl ether-based polyether polyol.

Various additives may be employed in the preparation of the isocyanate-terminated prepolymer and urethane forming-coating composition of this invention in order to improve the viscosity, stability, color, etc. For example, an antioxidant such as 2,6-di-tert-butyl-4-methyl phenol may be admixed with the isocyanate-terminated prepolymer solution. Viscosity control compounds or flow control compounds such as cellulose acetate butyrate in a solution of ethylene glycol monoethyl ether acetate may be advantageously employed. If desired, conventional pigments such as carbon black, titanium dioxide, etc. may be added to the solution to obtain a coating of a desired color, since the coatings of this invention are normally clear. Catalysts can also be employed in the preparation of the urethane coating forming composition although they are not necessary.

The isocyanate-terminated prepolymer described above can be employed to provide excellent urethane coatings by casting onto an appropriate surface and allowing the coating to cure. If desired, a urethane-forming coating composition can be prepared by admixing the isocyanate-terminated prepolymer of this invention with an inert organic solvent.

Any of the inert organic solvents previously discussed as suitable solvents in the preparation of the isocyanate-terminated prepolymer can be suitably employed herein. While the amount of solvent employed is not critical, sufficient solvent should be added to provide a composition which can be easily and economically applied. Thus, generally the urethane coating forming composition of this invention comprises between about 40 and about 80 percent solids, solids including the isocyanate-terminated prepolymer and any additional solid additives.

Preferably, the urethane coating of this invention is prepared by curing the isocyanate-terminated prepolymer or urethane-forming coating composition under atmospheric conditions, whereby the free —NCO groups react with the moisture in the air to effect solidification. Thus, the isocyanate-terminated prepolymer, either alone or in admixture with an inert solvent, is applied by conventional techniques, such as brushing, rolling, spraying, dipping, and the like. The liquid coated surface is cured in an atmosphere which contains at least about 15 percent relative humidity, and preferably in the range between about 35 and 65 percent relative humidity. The temperatures of the atmosphere may range from room temperature up to about 60° C. If desired, however, the finish can be force-dried at higher temperatures.

While the coatings of this invention cure satisfactorily in short periods of time, catalysts such as dibutyl tin dilaurate, trimethylpiperazine, stannous octoate, triethyl amine, 1,4-diazo bicyclo[2,2,2]-octane, etc. may be added prior to application of the coating to accelerate the curing process.

Air-dry moisture set coatings are preferred in the practice of this invention; however it is feasible to employ heat to cure the isocyanate-terminated prepolymers and urethane-forming compositions. In this embodiment of the invention, a temperature in the range between about 60° C. and about 200° C. is generally employed.

Curing can also be effected by employing various chain extending agents in combination with the isocyanate-terminated prepolymer or urethane-forming coating composition of the invention. The chain extender is preferably employed in an amount that is stoichiometric with respect to the isocyanate-terminated prepolymer. Suitable chain extenders include low molecular weight diols such as polypropylene diol, oxypropylated aniline, ethylene glycol, catechol, oxypropylated ethylene diamine, polyoxypropylenediamine, [4,4' - methylene bis(o - chloroaniline)], and mixtures thereof. It has been found particularly advantageous to employ [4,4'-methylene bis(o-chloroaniline)] as a curing agent.

The urethane coatings described herein have a wide range of applications in view of their previously enumerated excellent mechanical and chemical properties. They can be advantageously applied to a variety of surfaces. For example, metals including aluminum, stainless steel, various alloys, etc.; resins, e.g., epoxies and phenolics; fiber glass/resin laminates; glass; plastics; wood; etc., are advantageously protected by the aforementioned urethane coatings.

In view of their excellent properties, these coatings are particularly advantageous as sealants for aircraft. Thus, they are used for sealing fuel tanks and fuel cell cavities.

They are also valuable fairing compounds, that is, they are useful in sealing outside surfaces of aircraft. Thus, the combination of excellent solvent resistance, adhesion, and flexibility enhance the usefulness of these urethane coatings.

It is particularly surprising and unexpected to obtain such excellent coatings from the fluorinated glycidyl ether-based polyols in accordance with this invention in view of the discovery that analogous coatings based on non-glycidyl fluorinated epoxides are unsuitable for various applications. Thus, as is shown in detail in the examples below, an isocyanate-terminated prepolymer based on pentadecafluoroheptyl epoxyethane providing a coating having poor solvent resistance and a percent elongation less than 200, the minimum value required for sealing compounds as set forth in Military Specification MIL–S–8802C dated Apr. 19, 1961.

The following examples will serve to illustrate the practice of this invention.

EXAMPLE 1

(A) Preparation of polyol 1,1-dihydrotrifluoroethyl glycidyl ether was prepared from 1,1,1-trifluoroethanol, epichlorohydrin and sodium hydride as described in Canadian Pat. No. 724,201.

The amount of 46.8 g. of trifluoroethyl glycidyl ether, 17.4 g. propylene oxide and 3.68 g. glycerine were charged to a 3-neck flask and cooled to 5° C. in an ice bath. Boron trifluoride etherate catalyst (0.053 g.) was added to the reactants. After 24 hours, completion of the reaction was indicated by the absence of an exotherm upon the addition of an additional portion of boron trifluoride etherate. The viscous reaction mixture was dissolved in 200 ml. methylene chloride and neutralized with 0.5 ml. of triethylamine. The neutralized mixture was washed with 100 ml. of water. After separation, the organic layer was dried on molecular sieves, filtered and the solvent removed by use of a rotary evaporator at 80° C./1 mm. Hg. Analysis revealed that the resulting polyol had a hydroxyl number of 111 mg. KOH/g. and a fluorine content of 25.6% by weight; the molecular weight of the polyol was calculated to be 1510.

(B) Preparation of prepolymer

Toluene diisocyanate (10.45 g. of 80% by weight 2,4- and 20% by weight 2,6-isomer) was reacted with 30.2 g. of the polyol described in Part A under a nitrogen atmosphere; isocyanate analysis indicated that the reaction was 95% completed after two hours at 95° C. After cooling and degassing, the resulting prepolymer was cast on glass plates which had been pre-treated with a tetrafluoroethylene polymer release agent; the prepolymer was cured with moisture of the air for three weeks at 25° C. and 50% relative humidity. The properties of the cured coating are described in the table below.

EXAMPLE 2

(A) Preparation of polyol 1,1-dihydropentadecafluorooctyl glycidyl ether was prepared from 1,1-dihydropentadecafluorooctanol, epichlorohydrin, and sodium hydride.

Following the procedure of Example 1, 22.8 g. of perfluorooctyl glycidyl ether was reacted with 25.2 g. propylene oxide and 3.04 g. glycerine in the presence of 0.04 g. of boron trifluoride etherate. The resulting polyol had a hydroxyl number of 112 mg. KOH/g. and contained 30.2% by weight fluorine; the calculated molecular weight was 1500.

(B) Preparation of prepolymer

Following the procedure of Example 1, a prepolymer was prepared from 38.3 g. of the polyol described in Part A and 13.3 g. of toluene diisocyanate. The prepolymer was cast on a glass plate which had been treated with a tetrafluoroethylene polymer release agent and cured as described in Example 1; the properties of the cured coating are described in the table below.

EXAMPLE 3

(A) Preparation of polyol

Following the procedure of Example 1, 100 g. of 1,1,7-trihydrododecafluoroheptyl glycidyl ether, prepared from 1,1,7-trihydrododecafluoroheptanol, epichlorohydrin and sodium hydride, was reacted with 100 g. of oxypropylated glycerine of molecular weight 1,000 in the presence of 0.71 g. boron trifluoride etherate for 5 hours at 50° C. The resulting polyol had a hydroxyl number of 88.7 mg. KOH/g. and contained 27.7% by weight fluorine; the calculated molecular weight was 1900.

(B) Preparation of prepolymer

Following the procedure of the previous examples, 100 g. of the polyol described in Part A was reacted with 27.6 g. of toluene diisocyanate to provide a prepolymer, which was dissolved at 50% concentration in methyl ethyl ketone/toluene (50/50 by volume). A film was then cast onto a glass plate and cured as described in the previous examples; the properties of the cured coating are set forth in the table.

COMPARATIVE EXAMPLE

(A) Preparation of polyol

For purposes of comparison, an epoxy based polyol was made employing 5.6 g. of pentadecafluoroheptyl epoxyethane prepared by reacting diazomethane with pentadecafluorooctanaldehyde as described by V. G. Witterholt in Dissertation Abstracts 19, October–December 1958, p. 963, 5.6 g. oxypropylated glycerine of molecular weight 1,000 and 0.15 ml. antimony pentachloride catalyst. Immediately after the reactants were mixed together, the temperature rose to 34° C. and then cooled to 25° C. After 24 hours the viscous reaction mixture was neutralized with 1 ml. of triethylamine, dissolved in 30 ml. diethyl ether and filtered. Completion of the reaction was indicated by the absence of the IR band for the epoxy group at 11.0 and 11.6μ. Analysis of the resulting polyol revealed a fluorine content of 29.07% by weight and a hydroxyl number of 97 mg. KOH/g.; the calculated molecular weight of the polyol was 1725.

(B) Preparation of prepolymer

A prepolymer was prepared from the polyol of Part A and toluene diisocyanate employing the same amounts and reaction conditions as described in Example 3. A methyl ethyl ketone/toluene solution of this prepolymer was prepared in the same manner as described in Example 3; similarly a film was cast and cured and the properties determined as shown in the table below.

EXAMPLE 4

(A) Preparation of polyol

A polyether polyol was made following the procedure of Example 3 employing the following ingredients: 34.92 g. of 1,1,7-trihydrododecafluoroheptyl glycidyl ether, 4.38 g. oxypropylated glycerine having a molecular weight of 438 and 0.13 g. of boron trifluoride etherate. The polyether polyol had a hydroxyl number of 54.4 mg. KOH/g. and a fluorine content of 52% by weight; molecular weight (calc.) 3080.

(B) Preparation of prepolymer

Employing 26.5 g. of the polyol described in Part A and 4.47 g. toluene diisocyanate, a prepolymer was made following the procedure of the previous examples. This prepolymer was cast onto a glass plate and allowed to cure for 3 weeks at 25° C. and 50% relative humidity; the properties of the cured coating are described in the table below.

EXAMPLE 5

(A) Preparation of polyol

Following the procedure of the previous examples, 120.0 g. of 1,1,7-trihydrododecafluoroheptyl glycidyl ether were reacted with 60.0 g. of oxypropylated glycerine having a molecular weight of 438 in the presence of 0.6 g. of boron trifluoride etherate to provide a polyether polyol having a hydroxyl number of 127 mg. KOH/g. and a fluorine content of 39.4% by weight; molecular weight (calc.) 1320.

(B) Preparation of prepolymer

A prepolymer was made employing 39.3 g. of the polyol described in Part A and 15.1 g. hexamethylene diisocyanate and employing the procedure of the previous examples. Isocyanate analysis indicated that the reaction was 95% complete after 4 hours at 90° C. After cooling and degassing, 15 g. of the prepolymer was admixed with 3.29 g. of [4,4'-methylene-bis(o-chloroaniline)]. The resulting prepolymer mixture was dissolved in methyl ether ketone/toluene (50/50 by volume) to form a urethane forming coating composition having a solids content of 50 g./100 ml. This composition was cast onto a glass plate and cured as described in the previous examples; the properties of the cured coating are set forth in the table below.

TABLE

| Example | 1 | 2 | 3 | C-3 | 4 | 5 |
|---|---|---|---|---|---|---|
| Tensile strength (p.s.i.) [1] | 1,970 | 3,440 | 1,560 | 780 | 335 | 3,500 |
| Percent elongation [1] | 375 | 440 | 490 | 190 | 330 | 410 |
| Percent linear swelling [2] | 19 | 13.6 | 13 | 20 | 6.7 | 13 |
| Peel, lbs./min.[3] | 11.2A | | | | 3.0 | 1.6 |

[1] Tensile strength and elongation were determined on an Instron Tensile Tester employing a pulling speed of 1″/min. and a dumbbell sample ⅛ in. wide, 0.020 to 0.060 in. thick and having a free sample length of ½ in.

[2] Linear swelling was determined by immersing a disk of film 22 mm. in diameter and ⅛ inch thick in toluene for 3 days at 25±0.2° C. Linear swelling is reported as the increase in diameter expressed as percent of the original diameter.

[3] Peel strength was measured by applying a strip of coating 1″ x 4″ x 0.060″ thick to anodized aluminum conforming to Spec. QQ-A-362. After complete cure, the peel strength at 180° angle was measured on an Instron instrument by a 1″/min. pulling speed.

What is claimed is:

1. A urethane-forming coating composition comprising an isocyanate-terminated prepolymer which is the reaction product of
    (a) a polyether polyol having a hydroxyl number between about 20 and about 200 mg. KOH/g. comprising the reaction product of
        (i) a fluorinated glycidyl ether having the formula $$XRCR'R''OCH_2CR'''\text{---}CR'''H$$
        $$\diagdown O \diagup$$

wherein X is fluorine or hydrogen, R is a completely fluorinated alkylene radical having 1-10 carbon atoms, R' and R'' are independently selected hydrogen or perfluoralkyl having 1-10 carbon atoms and R''' is hydrogen or lower alkyl, with
        (ii) a polyfunctional initiator having between 3 and 8 reactive hydrogen groups per molecule, and
        (iii) a lower alkylene oxide in an amount between 0 and about 60 percent by weight of the total fluorinated glycidyl ether and polyfunctional initiator; with
    (b) an organic diisocyanate;
    the proportion of said isocyanate being sufficient to provide between about 1.2 and 2.2-NCO groups per each —OH group in said polyether polyol.

2. The coating composition of claim 1 comprising an inert solvent.

3. The coating composition of claim 2 wherein said solvent comprises a mixture of methyl ethyl ketone and toluene.

4. The coating composition of claim 1 wherein said fluorinated glycidyl ether has the formula $$XRCH_2OCH_2CH\text{---}CH_2$$
$$\diagdown O \diagup$$

wherein X is fluorine or hydrogen and R is a completely fluorinated alkylene radical having 1 to 10 carbon atoms.

5. The coating composition of claim 4 wherein said fluorinated glycidyl ether is 1,1-dihydrotrifluoroethyl glycidyl ether.

6. The coating composition of claim 5 wherein said polyfunctional initiator is glycerin, said lower alkylene oxide is propylene oxide, and said organic diisocyanate is toluene diisocyanate.

7. The coating composition of claim 6 comprising an inert solvent.

8. The coating composition of claim 4 wherein said fluorinated glycidyl ether is 1,1-dihydroperfluorooctyl glycidyl ether.

9. The coating composition of claim 8 wherein said polyfunctional initiator is glycerin, said lower alkylene oxide is propylene oxide, and said organic diisocyanate is toluene diisocyanate.

10. The coating composition of claim 9 comprising an inert solvent.

11. The coating composition of claim 4 wherein said fluorinated glycidyl ether is 1,1,7-trihydroperfluoroheptyl glycidyl ether.

12. The coating composition of claim 11 wherein said polyfunctional initiator is glycerin, said lower alkylene oxide is propylene oxide, and said organic diisocyanate is toluene diisocyanate or hexamethylene diisocyanate.

13. The coating composition of claim 12 comprising an inert solvent.

References Cited

UNITED STATES PATENTS

| 3,269,961 | 8/1966 | Bruson | 260—77.5AP |
| 3,318,960 | 5/1967 | Earing | 260—2EpA |
| 3,475,384 | 10/1969 | Trischler | 260—77.5AP |
| 3,505,411 | 4/1970 | Rice | 260—77.5AP |
| 3,417,035 | 12/1968 | Elmer | 260—348 |
| 3,463,762 | 8/1969 | Trischler | 260—77.5AP |

MORRIS LIEBMAN, Primary Examiner

P. R. MICHL, Assistant Examiner

U.S. Cl. X.R.

260—31.4R, 33.6F, 33.6UB, 77.5AM, 77.5AP